(12) United States Patent
Baker et al.

(10) Patent No.: US 7,038,162 B2
(45) Date of Patent: May 2, 2006

(54) HAND-HELD LASER WELDING WAND FILLER MEDIA DELIVERY SYSTEMS AND METHODS

(75) Inventors: Martin C. Baker, Budd Lake, NJ (US); Vincent Chung, Tempe, AZ (US); Federico Renteria, Greenville, SC (US); William F. Hehmann, Greer, SC (US)

(73) Assignee: Honeywell International, Inc., Morristown, NJ (US)

( * ) Notice: Subject to any disclaimer, the term of this patent is extended or adjusted under 35 U.S.C. 154(b) by 85 days.

(21) Appl. No.: 10/713,759

(22) Filed: Nov. 13, 2003

(65) Prior Publication Data

US 2005/0103756 A1    May 19, 2005

(51) Int. Cl.
  B23K 26/34    (2006.01)
  B23K 26/14    (2006.01)
(52) U.S. Cl. ............................. 219/121.63; 219/121.84
(58) Field of Classification Search ........... 219/121.63, 219/121.64, 121.84
  See application file for complete search history.

(56) References Cited

U.S. PATENT DOCUMENTS

| | | | |
|---|---|---|---|
| 2,851,581 A | 9/1958 | Libby | |
| 4,237,364 A | 12/1980 | Lemelson | |
| 4,564,736 A | 1/1986 | Jones et al. | |
| 4,665,529 A | 5/1987 | Baer et al. | |
| 4,676,586 A | 6/1987 | Jones et al. | |
| 4,704,030 A | 11/1987 | Steen et al. | |
| 4,724,299 A | 2/1988 | Hammeke | |
| 4,726,715 A | 2/1988 | Steen et al. | |
| 4,777,341 A | 10/1988 | Steen et al. | |
| 4,803,335 A | 2/1989 | Steen et al. | |
| 4,804,815 A | 2/1989 | Everett | |
| 4,814,575 A | 3/1989 | Petitbon | |
| 4,906,812 A | 3/1990 | Nied et al. | |
| 4,997,250 A | 3/1991 | Ortiz, Jr. | |
| 5,272,716 A | 12/1993 | Soltz et al. | |
| 5,321,228 A | 6/1994 | Krause et al. | |
| 5,365,032 A | 11/1994 | Muller et al. | |
| 5,446,257 A * | 8/1995 | Sakamoto et al. | 219/121.63 |
| 5,453,329 A | 9/1995 | Everett et al. | |
| 5,477,025 A | 12/1995 | Everett et al. | |
| 5,548,604 A | 8/1996 | Toepel | |
| 5,556,560 A | 9/1996 | Ahola et al. | |
| 5,653,381 A | 8/1997 | Azdasht | |
| 5,760,362 A | 6/1998 | Eloy | |
| 5,993,550 A | 11/1999 | Eloy | |
| 6,369,353 B1 | 4/2002 | Soska | |
| 6,593,540 B1 * | 7/2003 | Baker et al. | 219/121.63 |
| 2002/0017513 A1 | 2/2002 | Nagura et al. | |
| 2005/0056628 A1* | 3/2005 | Hu | 219/121.84 |

FOREIGN PATENT DOCUMENTS

| | | |
|---|---|---|
| AT | 401246 B | 7/1996 |
| DE | 3942048 A1 | 8/1990 |
| GB | 2227964 A * | 8/1990 |

(Continued)

*Primary Examiner*—Geoffrey S. Evans
(74) *Attorney, Agent, or Firm*—Ingrassia Fisher & Lorenz

(57) ABSTRACT

A hand-held laser welding wand includes one or more filler media delivery flow passages. The wand is dimensioned to be grasped with a single hand, thus filler media of various types and forms may be supplied to the weld area on a workpiece using various types of delivery systems and methods, including fully automated, semi-automated, or manually. The filler media may be delivered via the filler media delivery passages or separate from the passages.

23 Claims, 4 Drawing Sheets

FOREIGN PATENT DOCUMENTS

| | | | |
|---|---|---|---|
| JP | 59-70487 A | * | 10/1982 |
| JP | 9-103896 A | * | 4/1997 |
| JP | 9-323185 A | * | 12/1997 |
| JP | 11-347774 A | * | 12/1999 |
| JP | 11347774 A | | 12/1999 |
| WO | WO 97/07928 A | | 3/1997 |
| WO | PCT/US 03/03376 | | 6/2003 |
| WO | PCT/US2004/036813 | | 4/2005 |

* cited by examiner

HAND-HELD LASER WELDING WAND FILLER MEDIA DELIVERY SYSTEMS AND METHODS

CROSS-REFERENCE TO RELATED APPLICATIONS

This application is related to U. S. patent application Ser. No. 10/460,008, filed Jun. 12, 2003, which issued as U.S. Pat. No. 6,774,338, on Aug. 10, 2004, and is a divisional of U.S. patent application Ser. No. 10/071,025, filed Feb. 8, 2002, which issued as U.S. Pat. No. 6,593,540, on Jul. 15, 2003.

FIELD OF THE INVENTION

The present invention relates to laser welding and, more particularly, to a hand-held laser welding wand that provides for the delivery of various types of filler media via various systems and methods, including internal filler media supply conduits.

BACKGROUND OF THE INVENTION

Many components in a jet engine are designed and manufactured to withstand relatively high temperatures. Included among these components are the turbine blades, vanes, and nozzles that make up the turbine engine section of the jet engine. In many instances, various types welding processes are used during the manufacture of the components, and to repair the components following a period of usage. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on workpieces of differing types, materials, and configurations. Hence, there is a need for the provision of supplying filler media of various types and forms to the weld area on a workpiece, and/or the provision of supplying the various types and forms of filler media via various types of delivery systems and methods. The present invention addresses one or more of these needs.

SUMMARY OF THE INVENTION

The present invention provides and hand-held laser welding wand that is capable of supplying filler media of various types and forms to the weld area on a workpiece. The wand additionally allows for supplying the various types and forms of filler media using various types of delivery systems and methods.

In one embodiment, and by way of example only, a hand-held laser fusion welding assembly for treating a workpiece includes a main body and a nozzle. The main body is dimensioned to be grasped by a hand and has at least one or more filler media delivery flow passages extending through the main body. The main body is adapted to couple to at least a laser delivery system, and each main body filler media delivery flow passage is adapted to receive a filler media therein. The nozzle is coupled to the main body and has at least an aperture through which laser light from the laser delivery system may pass, and one or more filler media delivery flow passages each in fluid communication with the main body filler media delivery flow passages. Each nozzle filler media delivery flow passage extends though the nozzle and is configured to supply filler media to a workpiece.

In another exemplary embodiment, a laser fusion welding system includes a filler media delivery system, an optical cable, and a hand-held laser fusion welding assembly. The filler media delivery system is configured to supply filler media. The optical cable is coupled to a laser delivery system and is configured to transmit laser light therethrough. The hand-held laser fusion welding assembly includes a main body and a nozzle. The main body is dimensioned to be grasped by a hand and has at least one or more filler media delivery flow passages extending through the main body. The main body is adapted to couple to the optical cable, and each main body filler media delivery flow passage is coupled to receive the filler media supplied from the filler media delivery system. The nozzle is coupled to the main body, and has at least an aperture through which laser light transmitted through the optical cable may pass, and one or more filler media delivery flow passages each in fluid communication with the main body filler media delivery flow passages. Each nozzle filler media delivery flow passage extends though the nozzle and is configured to supply the filler media supplied from the filler media supply system to a workpiece.

In yet another exemplary embodiment, a method of treating a surface of a workpiece using a hand-held laser welding wand includes directing a laser beam through the hand-held laser welding wand and onto the workpiece surface, to thereby create a melt pool on the workpiece surface. Filler media from a filler media source is supplied to the melt pool. The wand and filler media source are controlled independent of one another.

Other independent features and advantages of the preferred welding wand filler media delivery systems and methods will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the following detailed description is merely exemplary in nature and is not intended to limit the invention or the application and uses of the invention. Furthermore, there is no intention to be bound by any theory presented in the preceding background or the following detailed description.

Figure 1:
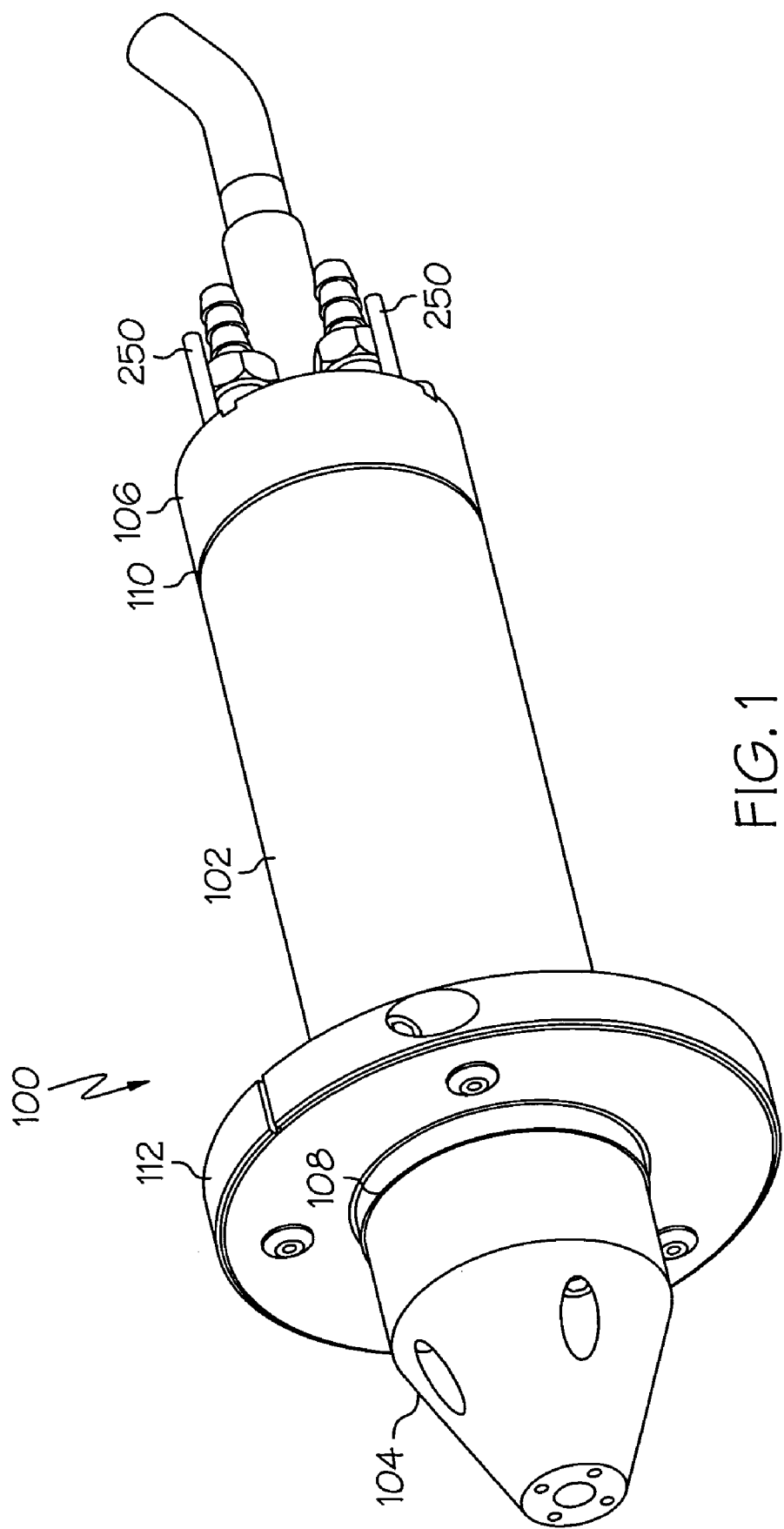
FIG. 1 is a perspective view of an exemplary hand-held laser welding wand.
Figure 2:
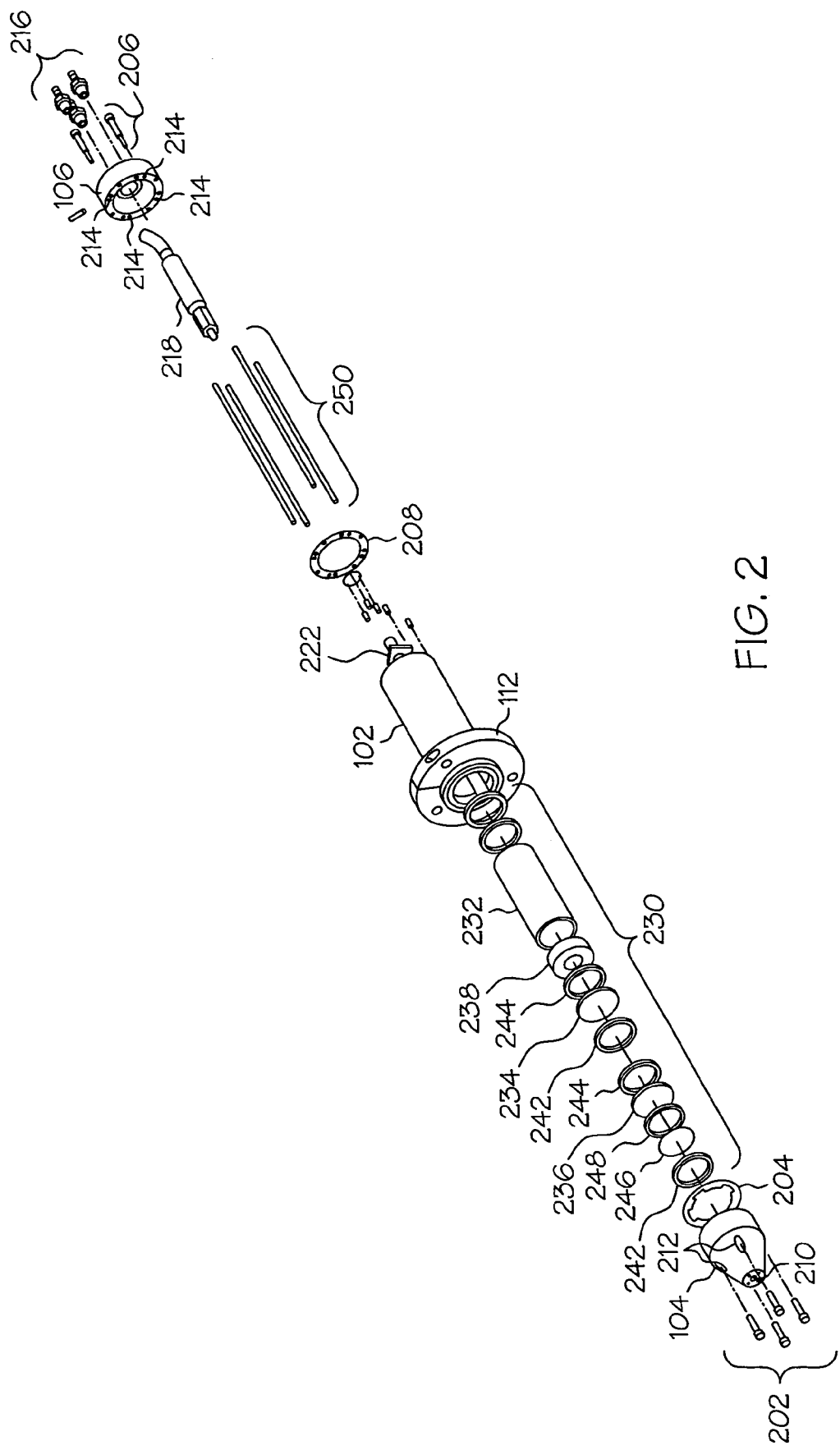
FIG. 2 is a perspective exploded view of the hand-held laser welding wand of FIG. 1.

Turning now to the description, and with reference first to FIGS. 1 and 2, an exemplary hand-held laser welding wand 100 is shown, and includes a main body 102, a nozzle 104, and an end cap 106. The main body 102, which is preferably configured as a hollow tube, includes a first end 108 and a second end 110. The main body first 108 and second 110 ends each include a plurality of threaded openings (not visible). As shown in FIG. 2, the threaded openings in the main body first end 108 each receive a nozzle fastener 202 having mating threads, and which are used to couple the nozzle 104 to the main body first end 108 via a first gasket 204. Similarly, the threaded openings in the main body second end 110 each receive an end cap fastener 206 that has mating threads, and which are used to couple the end cap 106 to the main body second end 110 via a second gasket 208. It will be appreciated that the nozzle 104 and end cap 106 could be coupled to the main body first 108 and second 110 ends, respectively, in a different manner. For example, one or both of the nozzle 104 and end cap 106 could be threaded onto the main body first 108 and second 110 ends, respectively. Moreover, it will be appreciated that the main body 102, and/or the nozzle 104, and/or the end cap 106 could be integrally formed.

A reflection shield 112 may additionally be coupled to the wand 100. The reflection shield 112, if coupled to the wand 100, is used to reflect laser light that may be reflected off a work piece back toward the wand 100. The main body 102 additionally includes a plurality of orifices and flow passages that extend between the main body first 108 and second ends 110. These orifices and flow passages are used to direct various fluids and other media through the main body 102 and to the nozzle 104. Included among these media are coolant, such as water, inert gas, such as Argon, and filler materials, such as powder, wire, or liquid. These orifices and flow passages are in fluid communication with orifices and flow passages in both the nozzle 104 and the end cap 106. A description of the specific configuration of the reflection shield 112, and the coolant and gas orifices and flow passages is not needed, and will thus not be further described in detail. However, the main body filler media orifices and flow passages will now be described. The concomitant filler media orifices and flow passages in the nozzle 104 and end cap 106 will also be described, when these components are separately described further below.

The main body 102 includes one or more filler media flow passages. In the depicted embodiment, the main body 102 includes four filler media flow passages, evenly spaced around the main body 102. As is shown most clearly in FIG. 3, which is a cross section view of the wand 100, each of these filler media flow passages 302 includes an inlet port 304 and an outlet port 306. The inlet port 304 is formed in the main body second end 110, and the outlet port 306 is formed in the main body first end 108. As will be described more fully below, the main body filler media flow passages 302 may be used to supply filler media to a work piece. Before doing so, however, the nozzle 104 and end cap 106 will be further described, beginning first with the nozzle 104.

The nozzle 104, as was noted above, is coupled to the main body first end 108, and includes an aperture 210 that extends through the nozzle 104 and fluidly communicates with the inside of the hollow main body 102. As will be described further below, it is through this aperture 210 that laser light passes during laser welding operations. The nozzle 104 additionally includes a plurality of fastener openings 212 that extend through the nozzle 104. A nozzle fastener 202 passes through each of the nozzle fastener openings 212 and into the main body first end 108, as described above, to couple the nozzle 104 to the main body 102.

Figure 4:
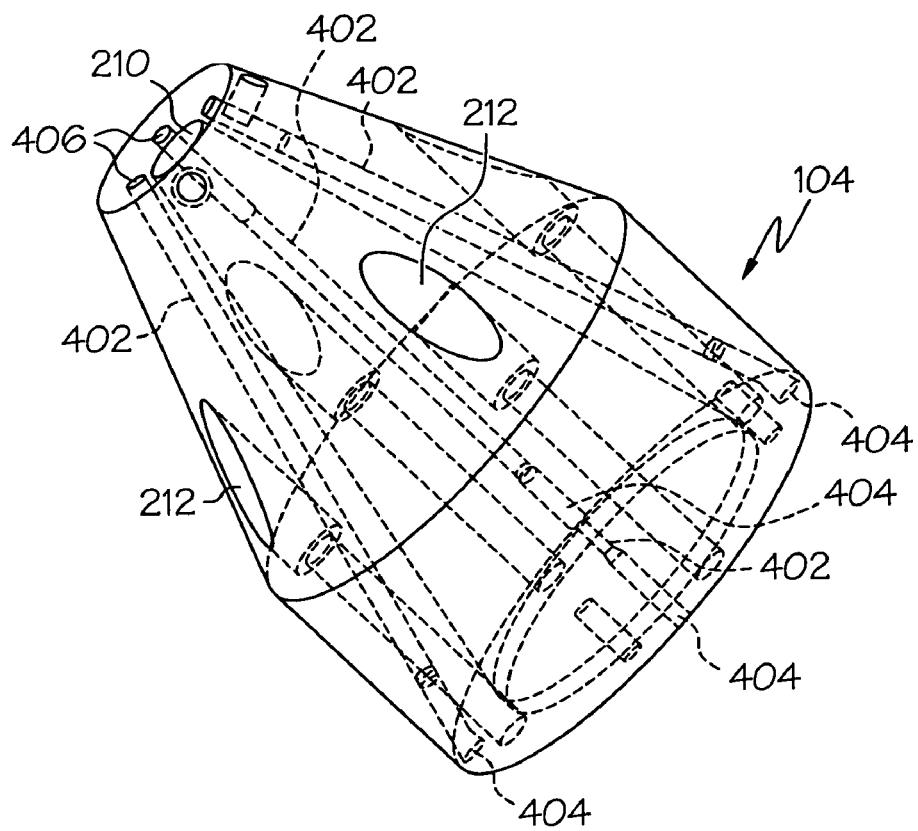
FIG. 4 is a perspective isometric view of an exemplary nozzle that may be used with the hand-held laser welding wand of FIGS. 1 and 2.

As shown more clearly in FIG. 4, the nozzle 104 additionally includes one or more filler media flow passages that, in conjunction with the main body filler media flow passages 302, are used to deliver a filler media to a work piece (not shown). In the depicted embodiment, the nozzle 104 includes four filler media flow passages 402, each in fluid communication with one of the main body filler media flow passages 302. The nozzle filler media flow passages 402, similar to the main body filler media flow passages 302, each include an inlet port 404 and an outlet port 406. When the nozzle 104 is coupled to the main body 102, each of the nozzle filler media flow passage inlet ports 404 is collocated with one of the main body filler media flow passage outlet ports 304. The nozzle filler media outlet ports 406 are preferably evenly spaced around the nozzle aperture 210, and are preferably dimensioned to receive an extension tube (not shown). A detailed description of the structure, function, and configuration of such extension tubes is not needed and, therefore, will not be provided.

Figure 5:
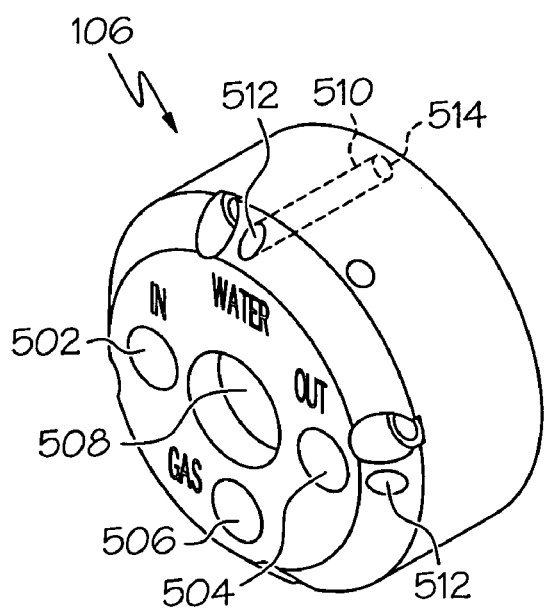
FIGS. 5 and 6 are perspective end views of an exemplary end cap that may be used with the hand-held laser welding wand of FIGS. 1 and 2.
Figure 6:
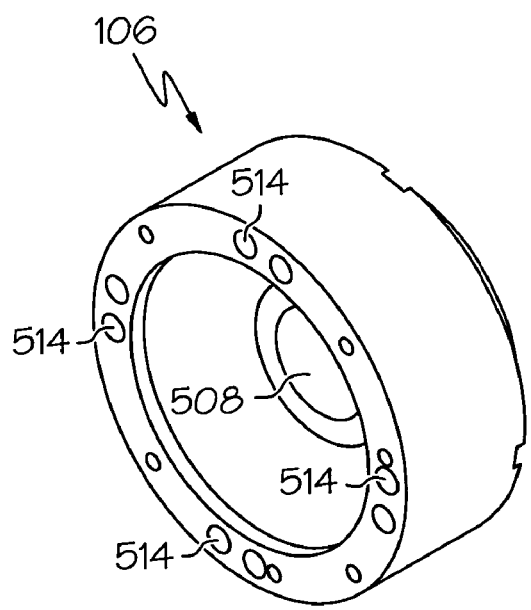

The end cap 106, as was noted above, is coupled to the main body second end 110 via the plurality of end cap fasteners 206. In particular, the end cap fasteners 206 extend, one each, through a plurality of end cap fastener openings 214 formed through the end cap 106, and into the main body second end 110. As shown in FIGS. 5 and 6, in addition to the end cap fastener openings 214, the end cap 106 also includes two coolant flow passages 502, 504, a gas flow passage 506, a cable passage 508, and a plurality of filler media supply passages 510 (only one shown in phantom in FIG. 5). The two coolant passages include a coolant supply passage 502 and a coolant return passage 504. The coolant supply passage 502 directs coolant, such as water, into appropriate coolant flow passages formed in the main body 102. The coolant return passage 504 receives coolant returned from appropriate coolant flow passages formed in the main body 102. The gas supply passage 506 directs an inert gas such as, for example, Argon, into appropriate gas flow passages formed in the main body 102. A barbed fitting 216 (see FIG. 2) is preferably coupled to each of the coolant supply 502, coolant return 504, and gas supply 506 passages. These barbed fittings 216 may be used to couple the passages 502–14 506 to hoses or other flexible conduits (not shown) that are in fluid communication with a coolant source or a gas source (not shown), as may be appropriate. As was noted above with respect to the main body 102, a detailed description of the coolant 502, 504 and gas 506 flow passages is not needed and will, therefore, not be provided.

The end cap cable opening 508 is adapted to receive an optical cable. In particular, and with reference back to FIGS. 2 and 3 it is seen that when an optical cable 218 is inserted into the cable opening 508, it extends through the end cap 106 and is coupled to a cable receptacle 222 mounted within the main body 102. The optical cable 218 is used to transmit laser light from a laser source (not shown) into the main body 102. An optics assembly 230 is mounted within the main body 102 and is used to appropriately collimate and focus the laser light transmitted through the optical cable 218 and receptacle 222, such that the laser light passes through the nozzle aperture 210 and is focused on a point in front of the nozzle aperture 210. A brief description of an embodiment of the optics assembly 230 will now be provided.

The optics assembly 230 includes a lens tube 232, a first lens 234, a second lens 236, and an optical adjustment screw 238. The lens tube 232 is preferably constructed of, or coated with, a material that is optically inert. For example, in the depicted embodiment, the lens tube 232 is constructed of black anodized aluminum. The first 234 and second 236 lenses are each mounted within the lens tube 232 via appropriate mounting hardware. In particular, each of the lenses 234, 236 is mounted between first and second retaining rings 242, 244. In addition, a lens cover 246 and lens cover spacer 248 are disposed in front of the second lens 236, providing physical protection for the second lens 236.

With the above described configuration, laser light transmitted through the optical cable 218 and receptacle 222 passes through the first lens 234, which refracts the laser light so that it travels substantially parallel to the interior surface of the lens tube 232. The parallel laser light then passes through the second lens 236, which focuses the laser light to a point in front of the nozzle aperture 210. It will be appreciated that the location of point in front of the nozzle aperture 210 to which the laser light is focused is a function of the focal length of the second lens 236, and its mounting location within the lens tube 232, which is determined by the second lens' retaining rings 242, 244. It will additionally be appreciated that the spacing of the first lens 234 relative to the optical receptacle 222 affects the collimation of the optics assembly 230. Hence, the optical adjustment screw 238 is movably mounted within the lens tube 232, and may be used to adjust the spacing between the first 234 and the optical receptacle 222. In a particular preferred embodiment, the inner surface of the lens tube 232 and the outer surface of the optical adjustment screw 238 are each threaded to provide this adjustability function.

Returning once again to FIGS. 5 and 6, it is seen that, at least in the depicted embodiment, the end cap 106 includes four filler media flow passages 510, each of which is in fluid communication with one of the main body filler media flow passages 302. The end cap filler media flow passages 510 each include an inlet port 512 (only two visible) and an outlet port 514. When the end cap 106 is coupled to the main body 102, each end cap filler media outlet port 514 is collocated with one of the main body filler media flow passage inlet ports 304. The end cap filler media inlet ports 512 may be coupled to receive any one of numerous types of filler media including, but not limited to, those delineated above. The particular filler media used may be fed into one or more of the end cap filler media inlet ports 512 either manually or, as will be further described below, the filler media may be fed automatically from a filler media feed assembly (not shown).

Returning once again to FIGS. 2 and 3, it is seen that a plurality of filler media liner tubes 250 are provided. These filler media liner tubes 250 may be inserted, one each, through one of the end cap filler media flow passages 510, and into the main body filler media flow passages 302. The filler media liner tubes 250 further guide the filler media into and through the main body 102, and into the nozzle filler media flow passages 402. The filler media liner tubes 250 also protect each of the filler media openings and flow passages against any erosion that could result from filler media flow or movement through the openings and flow passages. Although use of the filler media liner tubes 250 is preferred, it will be appreciated that the wand 100 could be used without the filler media liner tubes 250.

Figure 3:
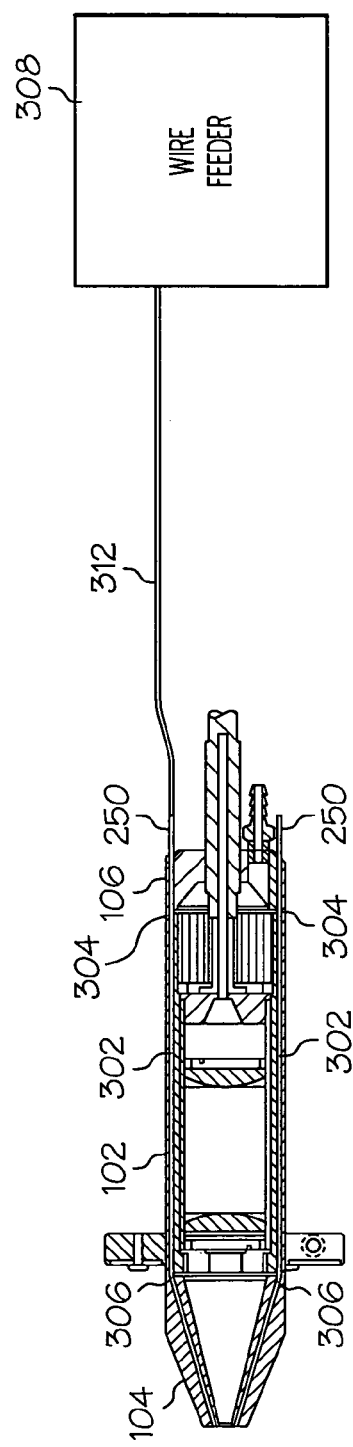
FIG. 3 is a cross section view of the hand-held laser welding wand shown in FIGS. 1 and 2, and coupled to a wire feeder.
Figure 7:
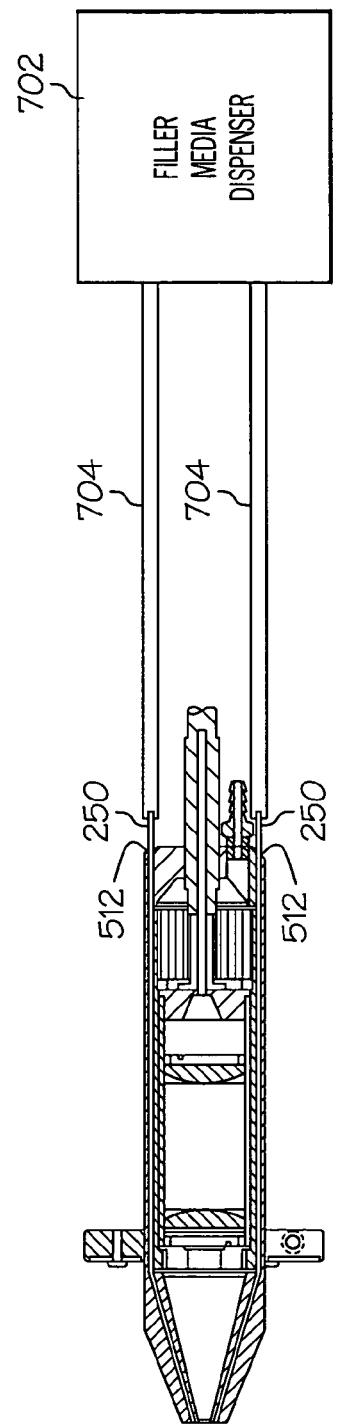
FIG. 7 is a cross section view of the hand-held laser welding wand shown in FIGS. 1 and 2, and coupled to a filler media dispenser.

The laser light transmitted through the nozzle aperture 210 is used to conduct various types of welding processes on various types, shapes, and configurations of work pieces. In many of these processes, a filler media is supplied to a melt pool formed on the work piece by the transmitted laser light. The filler media that is supplied to the melt pool may be fed into the end cap filler media inlet ports 512 or filler media liner tubes 250 manually, or the filler media may be fed automatically from a filler media feed assembly. For example, and as shown in FIG. 3, if the filler media being used is a wire type of filler media, a wire feeder 308 may be used to supply wire filler media 312 to the work piece via one or more of the filler media flow passages 510, 302, 402 that extend through the wand 100. It will be appreciated that the wire feeder 308 may be any one of numerous known types of wire feeders. Similarly, and as shown in FIG. 7, if the filler media being used is a powder type of filler media, or a liquid type of filler media, an appropriate type of automated filler media dispenser 702, which may be any one of numerous known types, may be supplied. One or more conduits 704 may then be coupled between the dispenser 702 and one or more of the end cap filler media inlet ports 512 or preferably, as shown in FIG. 6, between the dispenser 702 and one or more of the filler media liner tubes 250.

In addition to feeding filler media manually or automatically to a melt pool via the wand 100, filler media may alternatively be supplied to the melt pool independent of the wand 100. With this alternative supply method, the filler media may additionally be supplied either manually or automatically. Moreover, in carrying out some of the welding processes, the filler media may be supplied to the work piece before the melt pool is created by the laser light. Because the wand 100 is configured to be grasped by a hand of a user, the user's other hand is free to manipulate the filler media and/or control its supply to a work piece or melt pool, while independently manipulating and controlling the wand 100.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A hand-held laser fusion welding assembly, comprising:
   a main body dimensioned to be grasped by a hand and having a plurality of filler media delivery flow passages formed in and extending through the main body, each main body filler media flow passage having an inlet port and an outlet port, the main body adapted to couple to at least a laser delivery system, and each main body filler media delivery flow passage adapted to receive a filler media therein; and
   a nozzle coupled to the main body, the nozzle having at least an aperture through which laser light from the laser delivery system may pass, and a plurality of filler media delivery flow passages each having an inlet port and an outlet port, each nozzle filler media inlet port in fluid communication with a main body filler media delivery flow passage outlet port, and each nozzle filler media outlet port spaced around the aperture, each nozzle filler media delivery flow passage formed in and extending through the nozzle and configured to supply filler media to a workpiece.

2. The assembly of claim 1, further comprising:
   one or more filler media liner tubes, each liner tube disposed at least partially within one of the main body filler media delivery flow passages.

3. The assembly of claim 1, further comprising:
   an end cap coupled to the main body second end, the end cap having an optical cable opening adapted to receive an optical cable, and one or more filler media delivery flow passages each in fluid communication with one of the main body filler media delivery flow passages.

4. The assembly of claim 3, further comprising:
   one or more filler media liner tubes, each liner tube disposed at least partially within one of the end cap filler media delivery flow passages and one of the main body filler media delivery flow passages.

5. The assembly of claim 1, further comprising:
   an optics assembly mounted within the main body and configured to focus the laser light from the laser delivery system on a point in front of the nozzle aperture.

6. The assembly of claim 5, wherein the optics assembly comprises:
   a lens conduit having at least a first end and a second end;
   a first lens mounted within the lens conduit adjacent the lens conduit first end, the first lens configured to collimate the laser light from the laser delivery system; and
   a second lens mounted within the lens conduit adjacent the lens conduit second end, the second lens configured to focus the collimated laser light on the point in front of the nozzle aperture.

7. The assembly of claim 6, wherein at least the first lens is movably mounted within the lens conduit, and wherein the assembly further comprises:
   a receptacle assembly mounted within the main body adjacent the lens conduit first end, the receptacle assembly adapted to receive an optical cable through which the laser light from the laser delivery system is transmitted, and
   an optical adjustment screw movably mounted within the lens conduit adjacent the first lens, the optical adjustment screw configured to adjust a spacing between the first lens and the receptacle assembly, whereby the collimation of the delivered laser light is adjustable.

8. A laser fusion welding system, comprising:
   a filler media delivery system configured to supply filler media;
   an optical cable coupled to a laser delivery system and configured to transmit laser light therethrough; and
   a hand-held laser fusion welding assembly including:
   a main body dimensioned to be grasped by a hand and having at least one or more a plurality of filter media delivery flow passages formed in and extending through the main body, each main body filler media flow passage having an inlet port and an outlet port, the main body adapted to couple to the optical cable, and each main body filler media delivery flow passage coupled to receive the filler media supplied from the filler media delivery system, and
   a nozzle coupled to the main body, the nozzle having at least an aperture through which laser light transmitted through the optical cable may pass, and one or more a plurality of filler media delivery flow passages each having an inlet port and an outlet port, each nozzle filler media inlet port in fluid communication with the main body filler media delivery flow passage outlet port and each nozzle filler media outlet port spaced around the aperture, each nozzle filler media delivery flow passage formed in and extending through the nozzle and configured to supply the filler media supplied from the filler media supply system to a workpiece.

9. The system of claim 8, further comprising:
   one or more filler media liner tubes, each liner tube disposed at least partially within one of the main body filler media delivery flow passages,
   wherein the filler media supplied from the filler media delivery system either flows or extends through one or more of the liner tubes.

10. The system of claim 8, further comprising:
    an end cap coupled to the main body second end, the end cap having an optical cable opening through which the optical cable extends, and one or more filler media delivery flow passages each in fluid communication with one of the main body filler media delivery flow passages and coupled to receive the filler media supplied from the filler media delivery system.

11. The system of claim 10, further comprising:
    one or more filler media liner tubes, each liner tube disposed at least partially within one of the end cap filler media delivery flow passages and one of the main body filler media delivery flow passages,
    wherein the filler media supplied from the filler media delivery system either flows or extends through one or more of the liner tubes.

12. The system of claim 8, wherein the filler media delivery system comprises:
   a wire feeder; and
   one or more strands of wire filler media coupled to the wire feeder.

13. The system of claim 8, wherein the filler media delivery system comprises:
   a container having an inner volume;
   powder filler media disposed within the container inner volume; and
   one or more conduits, each conduit in fluid communication with the container inner volume and a main body filler media delivery flow passage.

14. The system of claim 8, wherein the filler media delivery system comprises:
   a container having an inner volume;
   liquid filler media disposed within the container inner volume; and
   one or more conduits, each conduit in fluid communication with the container inner volume and a main body filler media delivery flow passage.

15. The system of claim 8, further comprising:
   an optics assembly mounted within the main body and configured to focus the laser light from the laser delivery system on a point in front of the nozzle aperture.

16. The system of claim 15, wherein the optics assembly comprises:
   a lens conduit having at least a first end and a second end;
   a first lens mounted within the lens conduit adjacent the lens conduit first end, the first lens configured to collimate the laser light from the laser delivery system; and
   a second lens mounted within the lens conduit adjacent the lens conduit second end, the second lens configured to focus the collimated laser light on the point in front of the nozzle aperture.

17. The system of claim 16, wherein at least the first lens is movably mounted within the lens conduit, and wherein the system further comprises:
   an optical cable through which the laser light from the laser delivery system is transmitted;
   a receptacle assembly mounted within the main body adjacent the lens conduit first end, the receptacle assembly coupled to the optical cable; and
   an optical adjustment screw movably mounted within the lens conduit adjacent the first lens, the optical adjustment screw configured to adjust a spacing between the first lens and the receptacle assembly, whereby the collimation of the delivered laser light is adjustable.

18. A method of treating a surface of a workpiece using a hand-held laser welding wand, the method comprising the steps of:
   directing a laser beam trough the hand-held laser welding wand and onto the workpiece surface, to thereby create a melt pool on the workpiece surface;
   supplying filler media from an automated filler media source to the workpiece surface; and
   controlling the wand and the automated filler media source independent of one another.

19. The method of claim 18, wherein the wand and automated filler media source are each manually controlled.

20. The method of claim 19, wherein:
   the wand is manually manipulated by a first hand of a user; and
   the automated filler media source is manually controlled by a second hand of the user.

21. The method of claim 18, wherein the filler media is supplied to the work piece surface before the melt pool is created.

22. The method of claim 21, wherein the filler media is selected from the group consisting of paint, paste, powder, and foil.

23. The method of claim 18, wherein:
   the laser beam is directed through the hand-held laser welding wand along a first axis; and
   the filler material is supplied to the workpiece surface along a second axis.

* * * * *

UNITED STATES PATENT AND TRADEMARK OFFICE
CERTIFICATE OF CORRECTION

PATENT NO. : 7,038,162 B2  
APPLICATION NO. : 10/713759  
DATED : May 2, 2006  
INVENTOR(S) : Baker et al.

Page 1 of 1

It is certified that error appears in the above-identified patent and that said Letters Patent is hereby corrected as shown below:

Column 8, line 23, "filter" should be changed to --filler--;  
Column 10, line 17, "trough" should be changed to --through--.

Signed and Sealed this

Third Day of April, 2007

JON W. DUDAS  
*Director of the United States Patent and Trademark Office*